US006538649B2

(12) United States Patent
Bradski et al.

(10) Patent No.: US 6,538,649 B2
(45) Date of Patent: Mar. 25, 2003

(54) COMPUTER VISION CONTROL VARIABLE TRANSFORMATION

(75) Inventors: Gary R. Bradski, Palo Alto, CA (US); Mark A. Holler, Palo Alto, CA (US); Ryan A. Boller, Greensburg, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/204,010

(22) Filed: Dec. 1, 1998

(65) Prior Publication Data

US 2001/0040572 A1 Nov. 15, 2001

(51) Int. Cl.$^7$ .............................................. G06T 15/00
(52) U.S. Cl. ...................................... 345/419; 382/282
(58) Field of Search ................................. 345/419, 418, 345/348, 358, 157, 836, 863, 856; 382/276, 282, 283

(56) References Cited

U.S. PATENT DOCUMENTS

| | | | | |
|---|---|---|---|---|
| 5,148,477 A | * | 9/1992 | Neely et al. ..................... 382/6 |
| 5,287,437 A | | 2/1994 | Deering ....................... 395/127 |
| 5,327,161 A | * | 7/1994 | Logan et al. ................ 345/157 |
| 5,343,390 A | | 8/1994 | Doi et al. .................... 392/132 |
| 5,394,202 A | | 2/1995 | Deering ......................... 353/7 |
| 5,446,834 A | | 8/1995 | Deering ....................... 395/127 |
| 5,570,177 A | * | 10/1996 | Parker et al. .......... 356/139.06 |
| 5,751,836 A | | 5/1998 | Wildes et al. ............... 382/117 |
| 5,801,704 A | | 9/1998 | Oohara et al. .............. 345/358 |
| 5,802,220 A | * | 9/1998 | Black et al. ................. 382/276 |
| 5,805,165 A | * | 9/1998 | Thorne, III et al. ........ 345/348 |
| 5,805,733 A | | 9/1998 | Wang et al. ................. 382/232 |
| 5,923,776 A | | 7/1999 | Kamgar-Parsi ............. 382/173 |
| 5,926,568 A | | 7/1999 | Chaney et al. .............. 382/217 |
| 5,936,610 A | | 8/1999 | Endo ........................... 345/157 |
| 6,009,210 A | * | 12/1999 | Kang ........................... 382/276 |
| 6,028,960 A | | 2/2000 | Graf et al. ................... 382/203 |
| 6,070,003 A | | 5/2000 | Gove et al. .................. 710/132 |
| 6,097,839 A | | 8/2000 | Liu ............................. 382/181 |
| 6,111,517 A | * | 8/2000 | Atick et al. ................. 382/118 |
| 6,127,990 A | | 10/2000 | Zwern ........................... 345/8 |

OTHER PUBLICATIONS

"Workshop on Perceptual User Interfaces", The Banff Rocky Mountain Resort, Banff, Alberta, Canada http://research.microsoft.com/PUIWorkshop97/, 1 p., (Oct. 20–21, 1997).

Bradski, G.R., et al., "Computer Vision Modules for Game Interfaces and in Virtual Holography", *Workshop on Perceptual User Interfaces*, Banff, Alberta, Canada, pp. 10–13, (Oct. 19–21, 1997).

Cutler, L.D., et al., "Two–Handed Direct Manipulation on the Responsive Workbench", *Symposium on Interactive 3D Graphics*, pp. 107–114, (1997).

Freeman, W.T., et al., "Computer Vision for Computer Games", *Proceddings of the Second International Conference on Automatic Face and Gesture Recognition*, Killington, VT, pp. 100–105, (Oct. 14–16, 1996).

(List continued on next page.)

*Primary Examiner*—Cliff N. Vo
*Assistant Examiner*—Huedung X. Cho
(74) *Attorney, Agent, or Firm*—Schwegman, Lundberg, Woessner & Kluth, P.A.

(57) ABSTRACT

The generation of control variables for computer vision is disclosed. In one embodiment of the invention, a computerized system includes a video camera and a controller. The video camera tracks an object, such as the head of a user of the computer. The controller generates control variables having sensitivity to movement of the object that varies in accordance with movement of the object from a neutral position.

39 Claims, 4 Drawing Sheets

OTHER PUBLICATIONS

Parker, J.R., *Algorithms for Image Processing and Computer Vision*, John Wiley & Sons, Inc., pp. 241–243, (1997).

Ward, M., et al., "A Demonstrated Optical Tracker with Scalable Work Area for Head–Mounted Display System", *Proceedings of the Symposium on Interactive 3D Graphics*, Cambridge, MA, pp. 43–52, (1992).

Freeman, W., et al., "Computer Vision for Interactive Computer Graphics", *IEEE Computer Graphics and Applications*, pp. 42–53, (May/Jun. 1998).

Bradski, G.R., "Computer Vision Face Tracking For Use in a Perceptual User Interface", *Intel Technology Journal Q2*, 1–15, (1998).

Cheng, Y., "Mean Shift, Mode Seeking, and Clustering", *IEEE Transactions on Pattern Analysis and Machine Intelligence, 17*, Published by the IEEE Computer Society, 790–799, (Aug. 1995).

Comaniciu, D., et al., "Robust Analysis of Feature Spaces: Color Image Segmentation", *1997 IEEE Computer Society Conference on Computer Vision and Pattern Recognition*, San Juan, Puerto Rico, 750–755, (Jun. 17–19, 1997).

Cutler, R., et al., "View–based Interpretation of Real–time Optical Flow for Gesture Recognition", *Int. Conf. on Automatic Face and Gesture Recognition*, 416–421, (1998).

Davis, J.W., et al., "The Representation and Recognition of Human Movement Using Temporal Templates", *1997 IEEE Computer Society Conference on Computer Vision and Pattern Recognition*, San Juan, Puerto Rico, 928–934, (Jun. 17–19, 1997).

Fukunaga, K., "Introduction to Statistical Pattern Recognition", *2nd Edition, Academic Press, Inc.*, Harcourt Brace Jovanovich, Publishers, (Copyright, 1990).

Funt, B.V., et al., "Color Constant Color Indexing", *IEEE Transactions on Pattern Analysis and Machine Intelligence, 17*, Published by the IEEE Computer Society, 522–529, (May 1995).

Nagao, K., "Recognizing 3D Objects Using Photometric Invariant", *Proceedings Fifth International Conference on Computer Vision*, Massachusetts Institute of Technology, Cambridge, Massachusetts, 480–487, (Jun. 20–23, 1995).

Smith, A.R., "Color Gamut Transform Pairs", *Computer Graphics: A Quarterly Report of SIGGRAPH–ACM, 12*, 12–19, (Aug. 1978).

Swain, M.J., et al., "Color Indexing", *International Journal of Computer Vision, 7*, 1991 Kluwer Academic Publishers, Manufactured in The Netherlands, 11–32, (1991).

Yeo, B., et al., "Rapid Scene Analysis on Compressed Video", *IEEE Transactions on Circuits and Systems for Video Technology, 5*, A Publication of the Circuits and Systems Society, 533–544, (Dec. 1995).

Yeo, B., et al., "Retrieving and Visualizing Video", *Communications of the ACM, 40*, 43–52, (Nov. 1997).

Yeung, M.M., et al., "Time–constrained Clustering for Segmentation of Video into Story Units", *Proceedings of the 13th International Conference on Pattern Recognition, III*, Sponsored by The International Association for Pattern Recognition, 375–380, (Aug. 25–29, 1996).

Yeung, M.M., et al., "Video Browsing using Clustering and Scene Transitions on Compressed Sequences", *SPIE, 2417*, 399–413, (Feb. 1995).

* cited by examiner

COMPUTER VISION CONTROL VARIABLE TRANSFORMATION

FIELD OF THE INVENTION

This invention relates generally to computer vision, and more specifically to the generation of control variables for computer vision.

BACKGROUND

Typical input devices for computers include those for text entry, such as keyboards, and those for indication of directional movement, such as pointing devices. Common pointing devices include mouses, trackballs, joysticks, and touch pads. Pointing devices are used to navigate graphical user interfaces, such as those provided by versions of the Microsoft® Windows® operating system, as well as to play games, etc. Pointing devices are used for indication of directional movement because it is generally believed that pointing devices provide for a more intuitive and natural manner by which to accomplish this type of computer input as compared to input devices intended primarily for text entry, such as keyboards.

However, with the advent of video camera technology, it has been suggested that tracking the motion of an object, such as a pencil or a user's head, may be an even more intuitive and natural manner by which to accomplish computer input. For example, rather than using a joystick to navigate within a three-dimensional environment of a game such as a flight simulator, a user might instead move his or her head to indicate to the computer in which direction to move. Desirably, the video camera would pick up the change in movement of the user's head, and provide a corresponding input to the game. The use of a sensor such as a video camera to permit a computer to "see" an object and act thereon is generally known as computer vision.

Techniques by which to track objects like a user's head using a video camera, such that motion tracking variables tracking the desired object are produced, already exist—for example, such as that described in the copending and coassigned U.S. patent application entitled "Method and Apparatus for Tracking an Object Using a Continuously Adapting Shift Mean." However, the use of such motion tracking variables to specifically control movement within games and of pointers within user interfaces, etc., has in practice been generally recognized as difficult to accomplish. Thus, using video camera technology as an input device for a computer has not seen widespread use. It is noted that the variables are in fact static x, y, z, etc., numbers, not the rate of change in these variables, such that the term "motion tracking variables" as used herein refers either to static or true motion tracking variables.

For example, simply mapping the motion tracking variables to the plane of a computer screen to control the x and y coordinates of an object on the screen provides for disadvantageous computer input. Tracking the user's head to control this object on the screen typically yields very jittery motion of the object. The slightest movement of the user's head may result in movement of the object, and even when the user attempts to keep his or her head still to maintain the object's current position, the object is likely to jitter around annoyingly, because the video camera has discrete pixels to use for tracking continuous motion so there is often a +/- one pixel uncertainty in tracking.

Therefore, there is a need for more sophisticated use of video camera technology as a manner by which to accomplish computer input. The use of video camera technology to provide computer input should, for instance, provide for less-jittery control within computer applications such as games and graphical user interfaces.

SUMMARY

The present invention relates to the generation of control variables for computer vision. In one embodiment of the invention, a computerized system includes a video camera and a controller. The video camera tracks an object (e.g., in one particular embodiment, the head of a user of the computer). The controller (which in one particular embodiment is desirably a computer program running on a computer) generates control variables having sensitivity to movement of the object that varies in accordance with movement of the object from a neutral position. In one particular embodiment, these control variables may be used to provide smooth control of computer programs such as graphical user interfaces and games. Besides this embodiment, the invention includes other embodiments, including computerized systems, methods, computers, and computer-readable media of varying scope. The invention is not limited to any particular embodiment described in this summary.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. Reference to any particular feature, characteristic or aspect of any embodiment in the detailed description does not imply that such a particular feature, characteristic or aspect is required for any other embodiment described in the detailed description.

Figure 1:
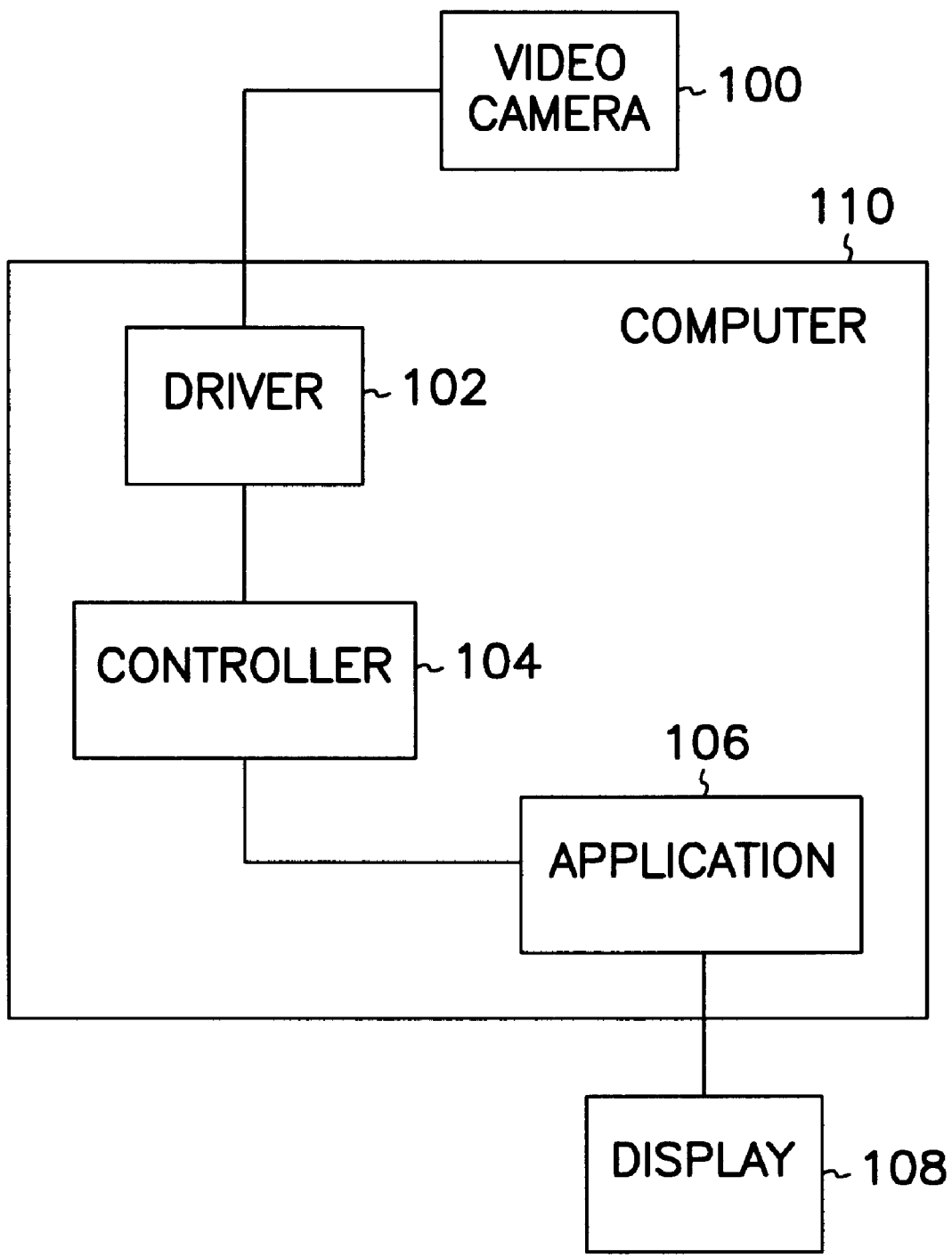
FIG. 1 shows a block diagram of a computerized system in accordance with an embodiment of the invention.

Referring first to FIG. 1, a block diagram of a computerized system according to one embodiment of the invention is shown. The computerized system of FIG. 1 includes a video camera 100, a driver 102, a controller 104, an application 106, and a display 108. As shown, the driver 102, the controller 104, and the application 106 are desirably part of a computer 110, although the invention is not so limited. In such an embodiment, the driver 102, the controller 104, and the application 106 are all desirably computer programs running on the computer 110—i.e., programs (viz., a driver program, a controller program, and an application program) executed by a processor of the computer from a computer-readable medium such as a memory or a storage device thereof. The computer 110 also desirably includes an operating system, not shown in FIG. 1, within which and in conjunction with which the programs run, as can be appreciated by those within the art.

The video camera 100 images an object, desirably the head of a user of the computer 110. The invention is not so limited, however; other objects that may be imaged include objects that are held in the user's hand or hands, such as an imitation gun, or a pencil. The invention is also not limited to a particular type of video camera 100, and such cameras are known within the art.

The video camera 100 is operatively coupled to the computer 110 of which driver 102 is desirably a part (e.g., by wired or wireless connection). The invention is not limited to the manner by which the video camera 100 is so operatively coupled, however. Desirably, the video camera 100 is operatively coupled via a hardware card installed within the computer 110, via a Universal Serial Bus (USB) within the computer 110, as known within the art, or via other manners.

In response to the imaging of the object by the video camera 100, the driver 102 generates motion tracking variables. That is, the driver 102 takes the raw data regarding the viewed object as detected by the video camera 100, and converts them to motion tracking variables reflecting the tracking of the object that the raw data represents. Motion tracking variables in the context of this patent application in one embodiment can mean the sequences of tracking variables (such as X and Y, etc.) that are either the static tracking variables or true motion variables. That is, motion tracking varaibles can mean in one embodiment of the invention either static tracking variables or true motion variables.

In one embodiment, in the case where the object is the user's head, the driver 102 returns the motion tracking variables including: the X and Y location of the face centroid of the user; the Z location of the face of the user, such that a small face area corresponds to a far-away Z, and a large face area corresponds to a close Z (relative to the video camera); roll of the face orientation, which is the angle of the major axis (i.e., the $0^{th}$ Eigenvector direction) of the local face or flesh distribution, and defined as the angular measure of the extent to which the user has tilted his or her left or right as he or she is facing the camera; quality of the face orientation, which is the $0^{th}$ Eigenvalue divided by the $1^{st}$ eigenvalue of the local face flesh distribution (i.e., corresponding to the minor axis), as can be appreciated by those within the art; yaw, the extent to which the user is looking left or right; pitch, the extent to which the user is looking up or down; and, head gaze (which may be measured by Z, the distance from the camera, yaw, the extent to which the head is oriented left or right, and pitch, the extent to which the head is oriented up or down). That is, desirably the motion tracking variables track movement of the object in six degrees of freedom and also the quality of the face orientation. The invention is not limited to these motion tracking variables, however (for example, eye gaze, where the user's are pointed, may be added), and a subset of these variables, and/or other variables in addition to or in lieu of these variables, may be utilized within the invention.

The invention is not limited to any particular manner by which the driver 102 generates motion tracking variables from the tracking of the object (e.g., the user's head) by the video camera 100. In one embodiment, the invention described in the coassigned and copending application entitled "Method and Apparatus for Tracking an Object Using a Continuously Adapting Shift Mean" may be utilized.

From the motion tracking variables generated by the driver 102, the controller 104 generates control variables having sensitivity to movement of the object that varies in accordance with movement of the object from a neutral position. In such a position, the object desirably has motion tracking variables reflecting predetermined X, Y and Z coordinates, and no roll, and no yaw or pitch in either gaze or head orientation. The motion tracking variables themselves contain noise and distortion effects, which makes for problematic use of these variables as a manner by which to accomplish computer input, as has been described in the background. The controller 104 transforms these motion tracking variables to control variables that can be used to accomplish computer input and that take into account noise and distortion effects, such that relatively jitter-free input is accomplished.

The controller 104 accomplishes this in one embodiment of the invention by generating control variables such that each of the X, Y and Z motion tracking variables' relative movement (e.g., above or below the neutral position) is scaled in N different ranges. That is, along a first (X) axis, the object is movable across different consecutive (first) ranges, such that the object has a different scaling factor within each (first) range; and, along a second (Y) axis (i.e., perpendicular to the first (X) axis), the object is also movable across different consecutive (second) ranges, also such that the object has a different scaling factor within each (second) range. Further, along a third (Z) axis, the object is also movable across different consecutive (third) ranges, such that the object has a different scaling factor within each (third) range. This means that each of the ranges may correspond to a different sensitivity of the control variables as to movement of the object as reflected by the motion tracking variables.

For example, if the X motion tracking variable is within range 1, X may be scaled by X scale 1 to generate a corresponding X control variable; if the X variable is within range 2, X is scaled by X scale 2; et seq. Thus, the control variables generated have sensitivity to movement of the object (e.g., the user's head) that varies in accordance with movement of the object from the neutral position, as the object moves through consecutive ranges. The variables may have either more or less sensitivity to such movement as the object moves away from the neutral position, depending on whether the scaling factors increase or decrease over the set of ranges along a given axis. This ability to provide differing sensitivity to the object's movement depending on the object's location provides the invention with the advantage of smooth and jitter-free computer vision computer input.

The generation of control variables by the controller 104 from the motion tracking variables may be mathematically represented in accordance with Equation (1) as follows $$F = \min(b_1, P)s_1 + [\min(b_2 - b^1, P - b_1)]^+ s_2 + \ldots + [\min(b_{i+1} - b_i, P - b_i)]^+ s_{i+1} + \ldots + [P - b_{N-1}]^+ s_N$$

where [argument]+ is equal to the argument if the argument >0, and 0 otherwise; min(A, B) returns the minimum of A and B; b1–bN represents the bounds of the ranges and s1–sN represents the corresponding range scale factors; P is the absolute value of the difference of the variable location as reflected by a given motion tracking variable from the neutral position; and, F is the control variable corresponding to the given motion tracking variable.

For example, assume the X motion tracking variable has four ranges, with a neutral position of X=80. If the user moves a distance L left of neutral within ten video pixels, the scale s1 may be zero (F=L*0+0+0+0), such that the corresponding control variables reflect no movement. This is useful to dampen small movements around the neutral position which may be noise, or fidgeting on the part of the user. Thus, the control variables remove the annoying jitter of video camera input as described in the background. As further examples, if the movement left is between ten and thirty pixels, the scale s2 may be such that (F=10*0+(L−10)*0.5+0+0); if L is in the range between thirty and fifty pixels, the scale s3 may be such that (F=10*0+20*0.5+(L−30)*1.0+0); and, if L is between fifty and eighty pixels, the scale s4 may be such that (F=10*0+20*0.5+20*1.0+(L−50)*2.0).

In other words, in accordance with the use of ranges as represented by the equation listed above, the embodiment of the invention generates control variables having sensitivity to movement of the object that varies in accordance with movement of the object from the neutral position. Where stability close to the neutral position is desired, with growing acceleration of movement in accordance with further distances away from the neutral position, the scale of the first range (closest to the neutral position) may be zero, with increasing scales as the ranges are farther from the neutral position. Thus, the control variables in this case are more sensitive to movement of the object tracked by the video camera as the object moves away from the neutral position.

Furthermore, where sensitivity close to the neutral position is desired, with decreasing acceleration of movement in accordance with further distances away from the neutral position, the scale of the last range (farthest from the neutral position) may be zero, with increasing scales as the ranges are closer to the neutral position. In this case, the control variables are less sensitive to movement of the object tracked by the video camera as the object moves away from the neutral position.

In one particular embodiment, the controller 104 is responsive to two keys on the keyboard. The first key is a "re-zero" key, and when depressed causes the controller 104 to reset the neutral point of each motion tracking variable to its current value. This is useful when a different user desires to use the invention, or when a user desires to change his or her neutral position. The second key temporarily stops issuance of control variables when depressed, until it is depressed again, and is thus a "pause/un-pause" key.

In the embodiment of the invention shown in FIG. 1, ultimately the application 106 receives the control variables generated by the controller 104, and utilizes them as input. In so doing, the application 106 may display output in response to this input on the display 108 operatively coupled to the computer 110, although the invention is not so limited. Although the display 108 is shown in FIG. 1 as directly controlled by the application 106, those of ordinary skill within the art can appreciate that the invention is not so limited. For example, within operating systems such as versions of the Microsoft™ Windows™ operating system, typically the application 106 controls output on the display 108 through the operating system, such as via an appropriate video display driver.

The invention is not limited by the manner by which the application 106 ultimately utilizes the control variables as input. In one embodiment, the application 106 provides for the display of a three-dimensional scene on the display 108, through which movement is controlled in accordance with the control variables. Such so-called scene immersion applications allow the user to immerse, navigate, fly or project himself or herself into a three-dimensional stereo or perspective scene. Common scene immersion applications include flight simulator programs.

In another embodiment of the invention, the application 106 provides for the display of a three-dimensional scene on the display 108, about which movement is controlled in accordance with the control variables. Thus, the user is able to move completely around the scene, and look at the scene from any direction. Examples of such applications include three-dimensional object editor programs, that enable a user to create and view a three-dimensional object.

In so utilizing the control variables generated by the controller 104, the application 106 may interpret the variables in any number of ways; the invention is not so limited. For example, in a "flight" mode, a Z control variable controls movement forward and backward within a scene; a Y control variable controls relative pitch; an orientation control variable controls roll along the local Z axis; and an X control variable controls yaw around the local Y axis. A gaze/head orientation control variable controls the eye point, the direction at which the mathematical scene view point is looking. Thus, movement is intuitively like that of a plane.

Another example is a "terrain following" mode, in which the altitude is always kept a constant distance over a three-dimensional graphical ground level. In this mode, a Z control variable controls movement forward and backward; a Y control variable and/or a gaze orientation control variable controls camera pitch (i.e., looking up, level or down); an X control variable translates left or right; and a head orientation turns locally within the scene (e.g., move to a global Y axis, turn, and move back). In another, "walking" mode, altitude is also always kept constant over the three-dimensional graphical ground level. However, gaze orientation controls eye point direction (i.e., camera pointing direction) absolutely; X still translates left or right, and head orientation still provides for turning locally within the scene; Z controls movement backwards and forwards.

Two other modes are "snake" and "XYZO." In the former mode, an X control variable causes locomotion forwarded when there is back and forth X movement; an orientation control variable causes restricted turning; a gaze control variable controls absolute eye point and direction; and the altitude is constrained to attachment to three-dimensional graphical surfaces. In the latter mode, movement as reflected by X, Y, and Z control variables cause one increment of movement left or right, up or down, and forward or back, respectively, in the scene; a head orientation turns one locally as in the "terrain following" mode; and, a gaze orientation controls eye point.

The invention is not limited to any particular manner by which the application 106 receives the control variables from the controller 104 to ultimately utilize them. For example, in one embodiment, the application 106 receives the control variables as described in the coassigned, cofiled, and copending application entitled "Synthesizing Computer Input Events." application Ser. No. 09/204,007 . In such an embodiment, the application 106 of the instant application receives the control variables as they are processed by the utility 104 of FIG. 1 of "Synthesizing Computer Input Events" application. That is, the application 106 receives the control variables indirectly, utilizing them in the sense that they have been processed by the utility to produce computer input events, such that these events are actually what the application 106 receives.

Desirably, the application 106 of FIG. 1 takes into account a rendered frame rate of a three-dimensional scene, if, for example, the application is ultimately utilizing the control variables to navigate about or through such a scene. This is accomplished so that rate of movement through or about the scene is substantially independent of the scene's complexity. Thus, a final screen movement S may be mathematically represented as S=F times R, where F is a control variable as has been described, and R is inversely proportional to the rendered frame rate. In this way, computer graphics and game movement commands, among other commands based on the utilization of the control variables, are issued on each rendered graphics frame, such that the movement amount S is sensitive to frame rate.

This is desirable since within a computer-rendered graphic, game, or other three-dimensional scene, simple views (e.g., look up at a blue sky) are rendered much more quickly than complex views (e.g., texture-mapped city skylines). Desirably, the final rate of movement does not depend on the complexity of the view of the three-dimensional scene to achieve satisfying movement about or through the scene. Thus, for example, if the rendered frame rate is 10 frames/second, then S is issued ten times per second, yielding 10 F times R/sec. If the rendered frame rate is 100 frames/second, then S yields 100 F times R/sec. However, since R is desirably set at 1/10 second and 1/100 second, respectively, a movement of F each second is achieved in both cases.

As has been described in conjunction with the embodiment of FIG. 1, some embodiments of the invention provides for advantages not found in the prior art. For example, within the prior art, direct utilization of motion tracking variables to control the X, Y and Z coordinates of an object on the screen provides for untenable, jittery, computer input. However, under the present invention, utilization of these variables to generate control variables, which may then be used to control movement of the object on the screen, conversely provides for tenable, smooth computer input. In one embodiment, this is accomplished by scaling the tracked movement in a set of ranges to produce object movement commands. There are different (first) ranges along a (first) X axis, different (second) ranges along a (second) Y axis, and different (third) ranges along a (third) Z axis, such that each range corresponds to the control variables having a different sensitivity to movement of the object through the range. The differing sensitivity of movement to the object depending on its location is thus the manner by which embodiments of the invention provide for advantages not found in the prior art.

Although the invention is not so limited, desirably an embodiment of the invention takes into account two special cases where the object tracked by the video camera is the user's head. These are the special case when the user is sitting in front of the monitor, and the special case relating to roll orientation. Each is now described in turn.

Figure 2:
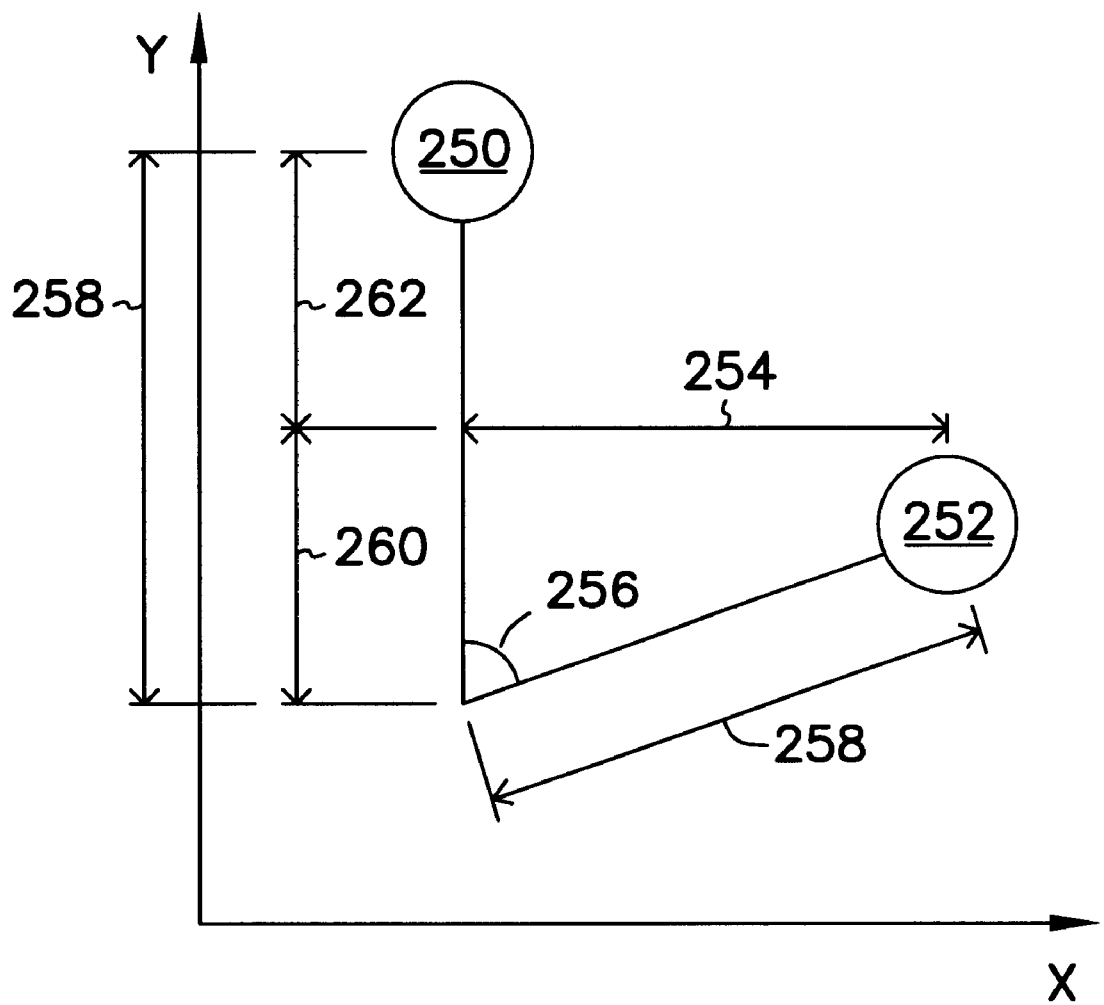
FIG. 2 shows a diagram of a user sitting facing a video camera to illustrate how horizontal movement also may cause unintended vertical movement.

Referring first to FIG. 2, a diagram is shown in which a user sitting facing a video camera leans to the right. Thus, the initial head position 250 of the user moves to the right to position 252 of the user. As apparent from FIG. 2, when this occurs, unintended vertical movement also occurs. That is, when a seated user moves his or her head to the left or the right (the latter case shown in FIG. 2), besides horizontal head movement occurring, unintended vertical movement also occurs.

To overcome this unintended vertical movement, a Y correction value must be added when transforming motion tracking variables to control variables. As an example, for a face flesh distribution, one 1 st Eigenvalue is proportional to face width. Empirically, the average ratio of face half width from face centroid to the seat is 1:13.75. Given a lean distance 254 (as shown in FIG. 2), and a seated size of 13.75 (shown as element 258 in FIG. 2), sin(angle 256)=lean distance 254/13.75. Therefore, angle $256=\sin^{-1}$(lean distance 254/13.75), such that distance 260=13.75*cos(angle 256) and thus Y correction value 262=13.75*(1−cos(angle 256)), in units of face half widths. Y correction value 262 is thus the value that is corrected for (added back) when leaning.

Figure 3:
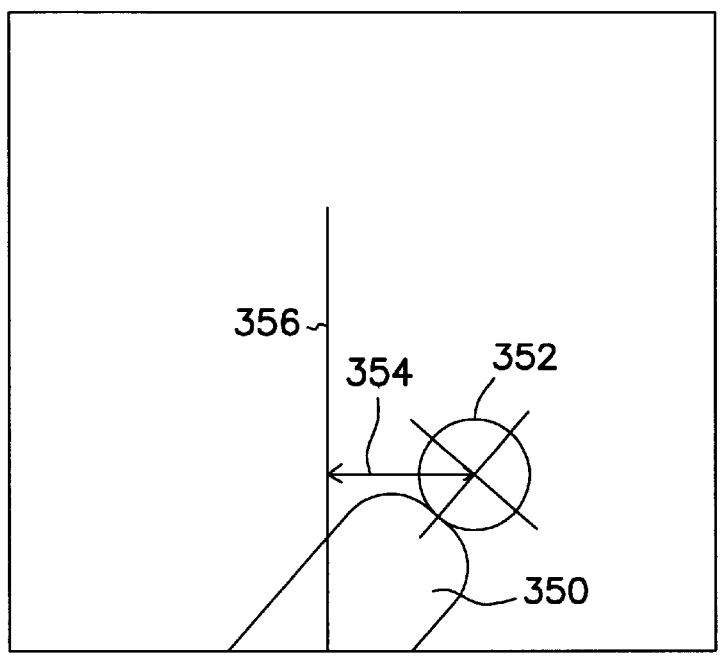
FIG. 3 shows a diagram of a user leaning his or her body to the right may also cause his or her head to also lean to the right.

Referring next to FIG. 3, a diagram is shown in which a user leaning his or her body to the right also causes his or her head to roll as well. Thus, the leaning of the user's body 350 causes the user's head 352 to lean as well. However, just because the user is leaning right does not mean that the user also wants to roll right. To correct for this situation, the first range boundary b1 in the equation listed above may be set large enough to contain the changes in face orientation that results from leaning, and the scale value s1 may be set to 0 so that leaning does not cause roll. An alternative solution is to subtract roll angle (element 256 of FIG. 2) induced by leaning from the measured head roll angle.

Figure 4:
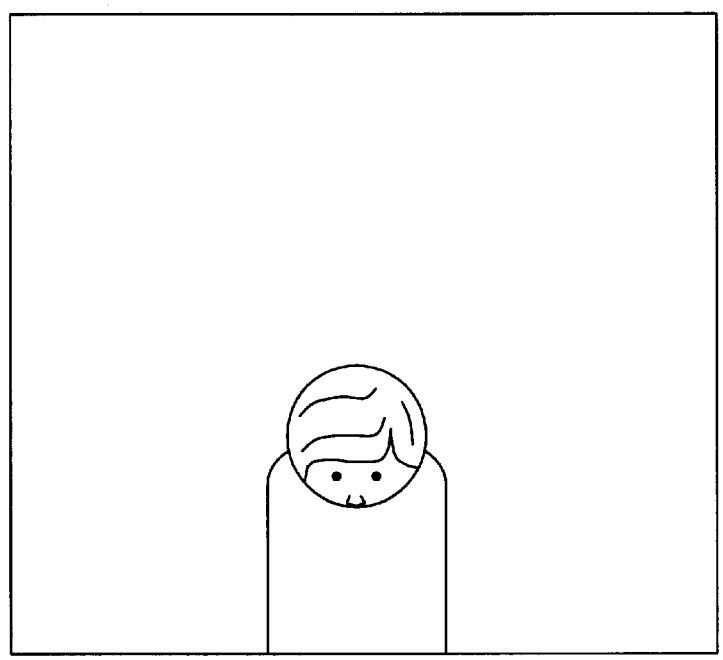
FIG. 4 shows a diagram of a user leaning down to illustrate how such leaning may cause a corrupt face orientation signal.

Referring finally to FIG. 4, a diagram is shown in which a user leaning his or her body forward (looking down at the keyboard, for example) causes a corrupt face orientation signal because the user's face is no longer completely visible to the video camera. It has been determined empirically that the measured quality (0th Eigenvalue divided by the 1st Eigenvalue) of the face orientation decreases markedly when the user is in a bad pose such as that of FIG. 4 (e.g., the quality decreases from above 1.4 to about 1.0). Therefore, the solution to the problem of FIG. 4 is to not have the controller issue roll control variables when the quality of the face orientation decreases markedly. Thus, in one embodiment of the invention, as has been described in conjunction with FIGS. 3 and 4, the control variables take into account roll quality.

Figure 5:
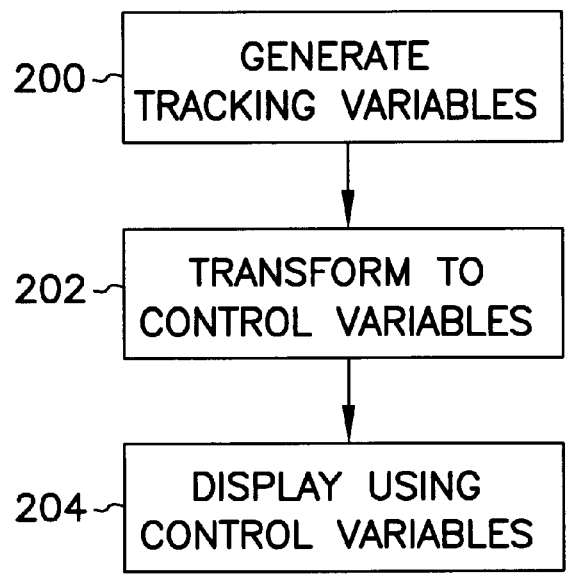
FIG. 5 shows a flowchart of a computerized method in accordance with an embodiment of the invention; and, FIG. 6 shows a diagram of a computer in conjunction with which embodiments of the invention may be practiced.

Referring now to FIG. 5, a flowchart of a computerized method in accordance with an embodiment of the invention is shown. The computerized method is desirably realized at least in part as one or more programs running on a computer—that is, as a program executed from a computer-readable medium such as a memory or a storage device by a processor of a suitably equipped computer. The programs are desirably storable on a computer-readable medium such as a floppy disk or a CD-ROM, for distribution and installation and execution on another (suitably equipped) computer.

In 200, tracking variables are generated. The tracking variables are in regard to an object tracked by a video camera, and are generated from data received from the video camera. Desirably, the object tracked is a user's head. In such a case, desirably the motion tracking variables represent quality of face orientation and six degrees of freedom: the X and Y location of the face centroid of the user's head; the Z location of the face of the user's head; roll of the face orientation; yaw; and and pitch.

In 202, the tracking variables are transformed to control variables. The control variables have sensitivity to movement of the object that varies in accordance with movement of the object from a neutral position. The control variables are desirably generated according to Equation (1) described and given above—i.e., where the object is movable across different (first) ranges along a (first) X axis, across different (second) ranges along a (second) Y axis, and across different (third) ranges across a (third) Z axis, such that each range corresponds to the control variables having a different sensitivity to movement of the object through the range. Thus, the control variables provide for computer input via video camera in a stable, non-jittery manner. Furthermore, in the case where the tracked object is the user's head, desirably the control variables take into account unintended vertical movement caused by horizontal movement, as well as roll orientation, as has been described.

Finally, in 204, data is displayed subject to the transformed control variables; for example, a three-dimensional scene is displayed, navigation through or about which is controlled in accordance with the control variables. Desirably, the displaying takes into account the rendered frame rate of the three-dimensional scene, so that rate of movement stays constant regardless of the complexity of the scene (e.g., where complex scenes require more time to be generated). In this case, the invention provides for an intuitive and natural manner by which to accomplish computer input to navigate three-dimensional scenes—viz., the movement of an object such as a user's head as tracked by a video camera.

Figure 6:
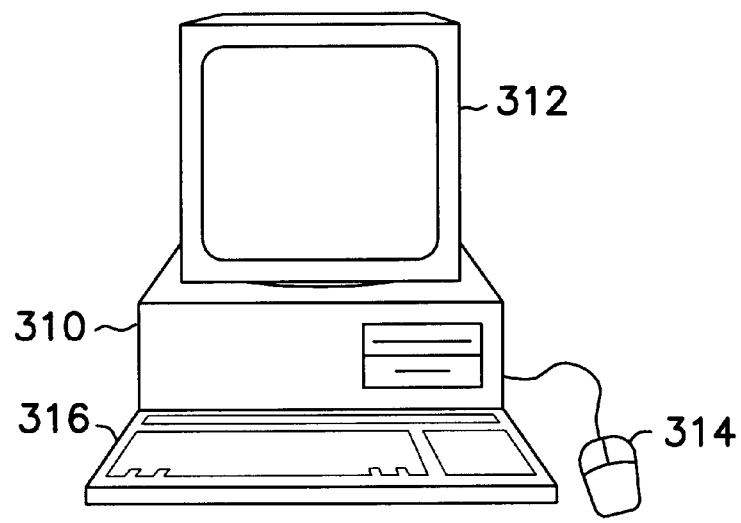

Referring finally to FIG. 6, a diagram of a representative computer in conjunction with which embodiments of the invention may be practiced is shown. Computer 310 is operatively coupled to monitor 312, pointing device 314, and keyboard 316. Computer 310 includes a processor (for example, Pentium® II processor available from Intel Corp.), random-access memory (RAM) (for example, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The invention is not particularly limited to any type of computer 310. Computer 310 desirably is a PC-compatible computer, running a version of the Microsoft® Windows® operating system.

Monitor 312 permits the display of information within a viewing area, including computer, video and other information, for viewing by a user of the computer. The invention is not limited to any particular monitor 312, and monitor 312 is one type of display device that may be used by the invention. Such monitors include cathode ray tube (CRT) displays, as well as flat panel displays such as liquid crystal displays (LCD's). Pointing device 314 permits the control of the screen pointer provided by the graphical user interface of operating systems such as versions of Microsoft™ Windows™. The invention is not limited to any particular pointing device 314. Such pointing devices include mouses, touch pads, trackballs, wheels, remote controls and point sticks. Finally, keyboard 316 permits entry of textual information into computer 310, as known within the art, and the invention is not limited to any particular type of keyboard.

The generation of control variables for computer vision has been described. In one embodiment, a computerized system includes a video camera and a controller. The video camera tracks an object, such as the head of a user of the computer. The controller generates control variables having sensitivity to movement of the object that varies in accordance with movement of the object from a neutral position. In one specific embodiment, this is accomplished by providing a set of ranges, across which the object is movable across different (first) ranges along a (first) X axis, across different (second) ranges along a (second) Y axis, and across different (third) ranges along a (third) Z axis, such that each range corresponds to the control variables having a different sensitivity to movement of the object through the range.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is manifestly intended that this invention be limited only by the following claims and equivalents thereof

We claim:

1. A computerized system comprising:
   a video camera to track an object; and,
   a controller to generate control variables having sensitivity to movement of the object that varies in accordance with movement of the object from a neutral position.

2. The computerized system of claim 1, wherein the video camera is to control an absolute graphics camera viewpoint of a three-dimensional scene.

3. The computerized system of claim 1, wherein the control variables are more sensitive to movement of the object as the object moves away from the neutral position.

4. The computerized system of claim 1, wherein the control variables are less sensitive to movement of the object as the object moves away from the neutral position.

5. The computerized system of claim 1, wherein the object is movable across different ranges, each range corresponding to a different sensitivity of the control variables.

6. The computerized system of claim 5, wherein the ranges are divided into first ranges along a first axis and second ranges along a second axis.

7. The computerized system of claim 6, wherein the first axis is perpendicular to the second axis.

8. The computerized system of claim 1, further comprising a display having a three-dimensional scene through which movement is controlled in accordance with the control variables.

9. The computerized system of claim 8, wherein the movement through the three-dimensional scene takes into account a rendered frame rate of the scene so that rate of movement through the scene is substantially independent of complexity of the scene.

10. The computerized system of claim 1, further comprising a display having a three-dimensional scene about which movement is controlled in accordance with the control variables.

11. The computerized system of claim 10, wherein the movement about the three-dimensional scene takes into account a rendered frame rate of the scene so that rate of movement about the scene is substantially independent of complexity of the scene.

12. The computerized system of claim 1, wherein the object comprises a head of a user of the computer.

13. The computerized system of claim 12, wherein the control variables take into account roll orientation.

14. The computerized system of claim 12, wherein the control variables take into account unintended vertical movement as a result of horizontal movement.

15. The computerized system of claim 1, wherein the controller comprises a computer program running on a computer.

16. A computerized method comprising:
   generating tracking variables regarding an object from data received from a video camera tracking the object; and, transforming the tracking variables to control variables having sensitivity to movement of the object that varies in accordance with movement of the object from a neutral position.

17. The computerized method of claim 16, further comprising displaying the three-dimensional scene about which movement is controlled in accordance with the control variables.

18. The computerized method of claim 17, wherein the movement about the three-dimensional scene takes into account a rendered frame rate of the three-dimensional scene.

19. The computerized method of claim 16, further comprising displaying the three-dimensional scene through which movement is controlled in accordance with the control variables.

20. The computerized method of claim 19, wherein the movement through the three-dimensional scene takes into account a rendered frame rate of the three-dimensional scene.

21. The computerized method of claim 16, wherein the object comprises a head of a user and transforming the tracking variables to control variables comprises taking into account roll orientation.

22. The computerized method of claim 16, wherein the object comprises a head of a user and transforming the tracking variables to control variables comprises taking into account unintended vertical movement as a result of horizontal movement.

23. The computerized method of claim 16, wherein the object is movable across different first ranges across a first axis and different second ranges across a second axis perpendicular to the first axis, each range corresponding to a different sensitivity of the control variables.

24. The computerized method of claim 16, wherein the tracking variables track movement of the object in six degrees of freedom.

25. A computer comprising:
a processor;
a computer-readable medium;
a controller program executed by the processor from the medium to generate control variables having sensitivity to movement of an object tracked by a video camera that varies in accordance with movement of the object from a neutral position.

26. The computer of claim 25, wherein the computer-readable medium is selected from the group essentially consisting of: a memory, a storage device.

27. The computer of claim 25, wherein the object is movable across different first ranges across a first axis and different second ranges across a second axis perpendicular to the first axis, each range corresponding to a different sensitivity of the control variables.

28. A computer-readable medium having a controller program stored thereon to cause a suitably equipped computer to generate control variables having sensitivity to movement of an object tracked by a video camera that varies in accordance with movement of the object from a neutral position.

29. The computer-readable medium of claim 28, wherein the object is movable across different first ranges across a first axis and different second ranges across a second axis perpendicular to the first axis, each range corresponding to a different sensitivity of the control variables.

30. A computerized system comprising:
a video camera to track an object; and,
a controller to generate control variables having sensitivity to movement of the object that varies in accordance with movement of the object from a neutral position, wherein the object is movable across different ranges, each range corresponding to a different sensitivity of the control variables, and wherein the ranges are divided into first ranges along a first axis and second ranges along a second axis.

31. The computerized system of claim 30, wherein the first axis is perpendicular to the second axis.

32. A computerized system comprising:
a video camera to track an object;
a controller to generate control variables having sensitivity to movement of the object that varies in accordance with movement of the object from a neutral position; and
a display having a three-dimensional scene through which movement is controlled in accordance with the control variables, wherein the movement through the three-dimensional scene takes into account a rendered frame rate of the scene so that rate of movement through the scene is substantially independent of complexity of the scene.

33. A computerized system comprising:
a video camera to track an object;
a controller to generate control variables having sensitivity to movement of the object that varies in accordance with movement of the object from a neutral position; and
a display having a three-dimensional scene about which movement is controlled in accordance with the control variables, wherein the movement about the three-dimensional scene takes into account a rendered frame rate of the scene so that rate of movement through the scene is substantially independent of complexity of the scene.

34. A computerized method comprising:
generating tracking variables regarding an object from data received from a video camera tracking the object;
transforming the tracking variables to control variables having sensitivity to movement of the object that varies in accordance with movement of the object from a neutral position; and
displaying the three-dimensional scene about which movement is controlled in accordance with the control variables, wherein the movement about the three-dimensional scene takes into account a rendered frame rate of the three-dimensional scene.

35. A computerized method comprising:
generating tracking variables regarding an object from data received from a video camera tracking the object;
transforming the tracking variables to control variables having sensitivity to movement of the object that varies in accordance with movement of the object from a neutral position; and
displaying the three-dimensional scene through which movement is controlled in accordance with the control variables, wherein the movement through the three-dimensional scene takes into account a rendered frame rate of the three-dimensional scene.

36. A computerized method comprising:
generating tracking variables regarding an object from data received from a video camera tracking the object; and,
transforming the tracking variables to control variables having sensitivity to movement of the object that varies in accordance with movement of the object from a neutral position, wherein the object comprises a head of a user and transforming the tracking variables to control variables comprises taking into account roll orientation.

37. A computerized method comprising:

generating tracking variables regarding an object from data received from a video camera tracking the object; and, transforming the tracking variables to control variables having sensitivity to movement of the object that varies in accordance with movement of the object from a neutral position, wherein the object is movable across different first ranges across a first axis and different second ranges across a second axis perpendicular to the first axis, each range corresponding to a different sensitivity of the control variables.

38. A computer comprising:

a processor;

a computer-readable medium;

a controller program executed by the processor from the medium to generate control variables having sensitivity to movement of an object tracked by a video camera that varies in accordance with movement of the object from a neutral position, wherein the object is movable across different first ranges across a first axis and different second ranges across a second axis perpendicular to the first axis, each range corresponding to a different sensitivity of the control variables.

39. A computer-readable medium having a controller program stored thereon to cause a suitably equipped computer to generate control variables having sensitivity to movement of an object tracked by a video camera that varies in accordance with movement of the object from a neutral position, wherein the object is movable across different first ranges across a first axis and different second ranges across a second axis perpendicular to the first axis, each range corresponding to a different sensitivity of the control variables.

* * * * *